Figure 1:
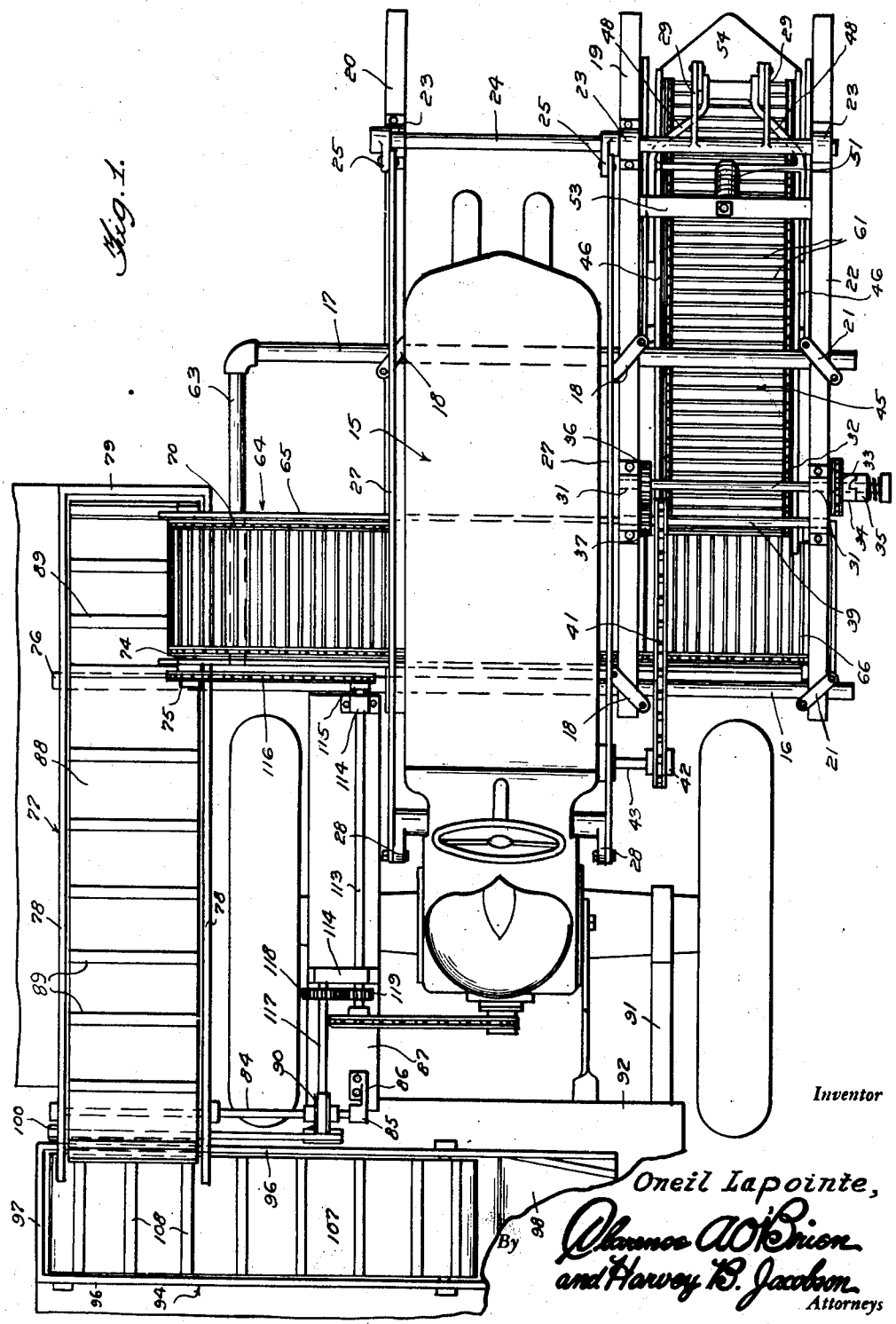

Nov. 16, 1948.   O. LAPOINTE   2,453,714
VEGETABLE HARVESTER

Filed July 14, 1945   6 Sheets-Sheet 1

Inventor
Oneil Lapointe,
By Clarence A. O'Brien
and Harvey B. Jacobson
Attorneys Nov. 16, 1948.　　　　O. LAPOINTE　　　　2,453,714
VEGETABLE HARVESTER
Filed July 14, 1945　　　　　　　　　　　6 Sheets-Sheet 4

Inventor
Oneil Lapointe,
By
Attorneys

Nov. 16, 1948.  O. LAPOINTE  2,453,714
VEGETABLE HARVESTER
Filed July 14, 1945  6 Sheets-Sheet 5
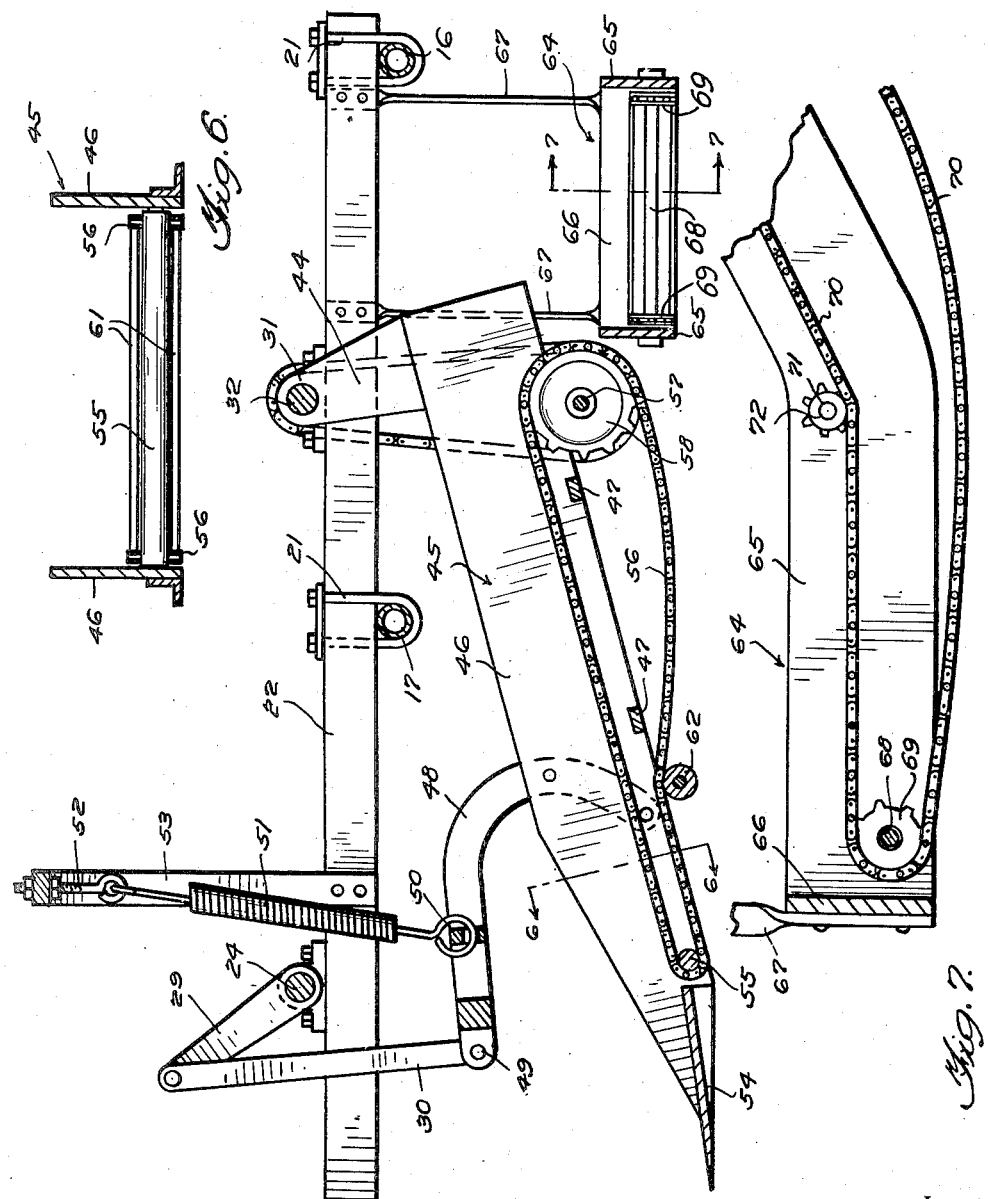
Inventor
Oneil LaPointe,
By Clarence A. O'Brien
and Harvey B. Jacobson
Attorneys

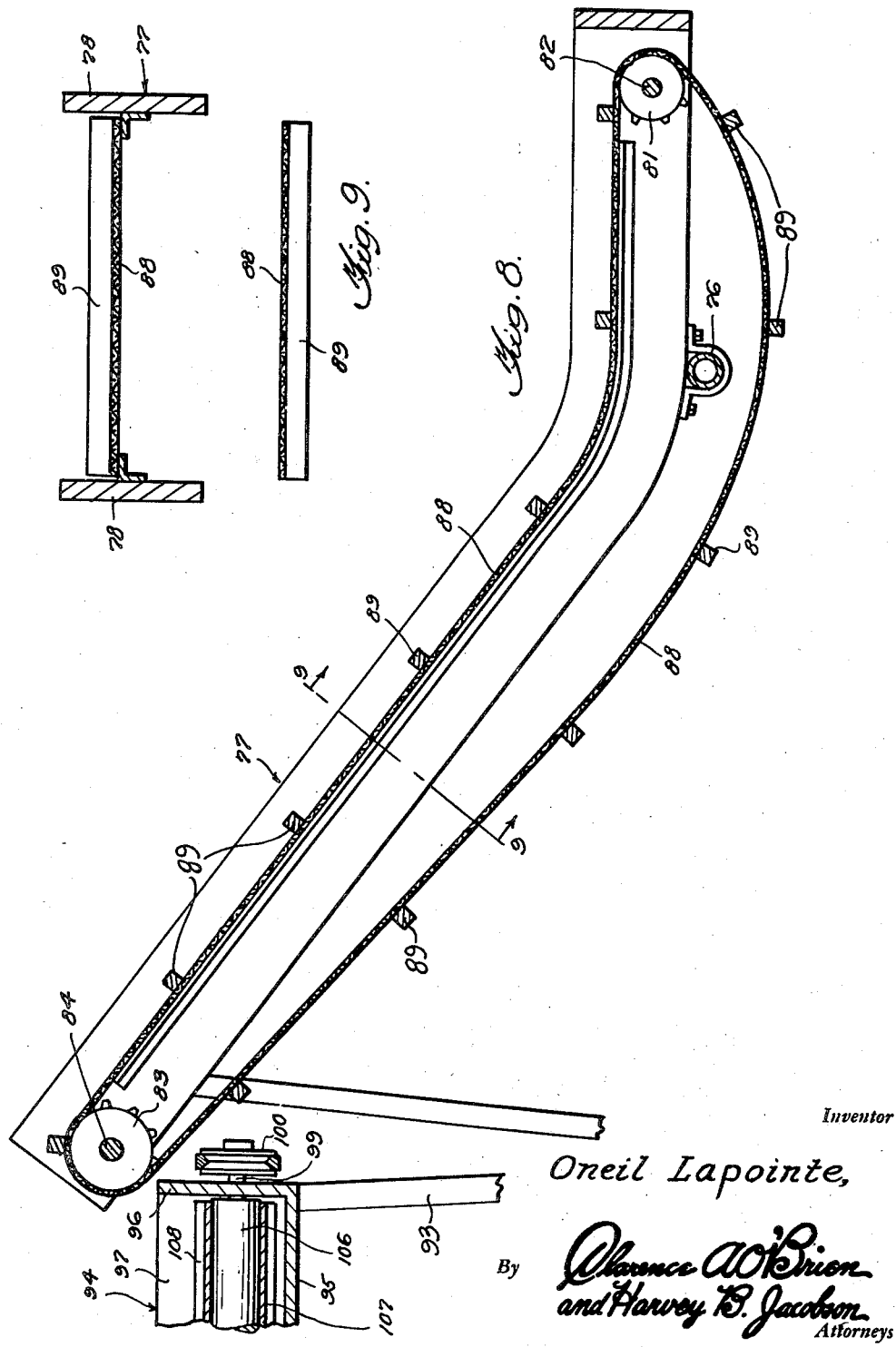

Patented Nov. 16, 1948

2,453,714

UNITED STATES PATENT OFFICE 2,453,714

VEGETABLE HARVESTER

Oneil Lapointe, Van Buren, Maine

Application July 14, 1945, Serial No. 605,147

3 Claims. (Cl. 55—51)

This invention relates to a vegetable harvester and more particularly to a harvester for root vegetables such as potatoes, beets and the like.

The primary object of the invention is to extract the vegetables from the ground and to deliver them in a cleaned condition to a picking and sorting table ready for delivery into suitable containers such as barrels or sacks.

Other objects include separating the vegetables from vines, small stones, sticks and like debris before they are delivered to the picking and sorting table.

Still other objects include so delivering the vegetables to the picking and sorting table that they readily may be separated from stones and other debris delivered to the table along with them.

The above and other objects may be attained by employing this invention which embodies among its features an attachment adapted to be mounted on the frame or chassis of a tractor or like wheeled vehicle, which attachment comprises a pair of separate conveyors, arranged on opposite sides of the tractor in parallel relation to the longitudinal axis of the tractor, a transfer conveyor arranged beneath the tractor frame or chassis to operate transversely thereof and deliver vegetables from one of the first mentioned conveyors to the other and a picking table having a surface which moves parallel with the transfer conveyor onto which the vegetables are delivered for sorting, grading and the removal of stones and other debris prior to being packaged.

Other features embody means connected to the power takeoff of the tractor on which the equipment may be mounted for driving the transfer conveyor, the rearmost longitudinal conveyor and the movable surface of the picking table in unison so that the delivery and picking, sorting and grading may be carried on simultaneously.

Still other features embody means connecting the digging or advance conveyor to the power pulley shaft of the tractor so that its operation may be regulated independently of the operation of the other conveyors, and power actuated means for raising or lowering the forward plow or digger end of the advance conveyor.

Figure 2:
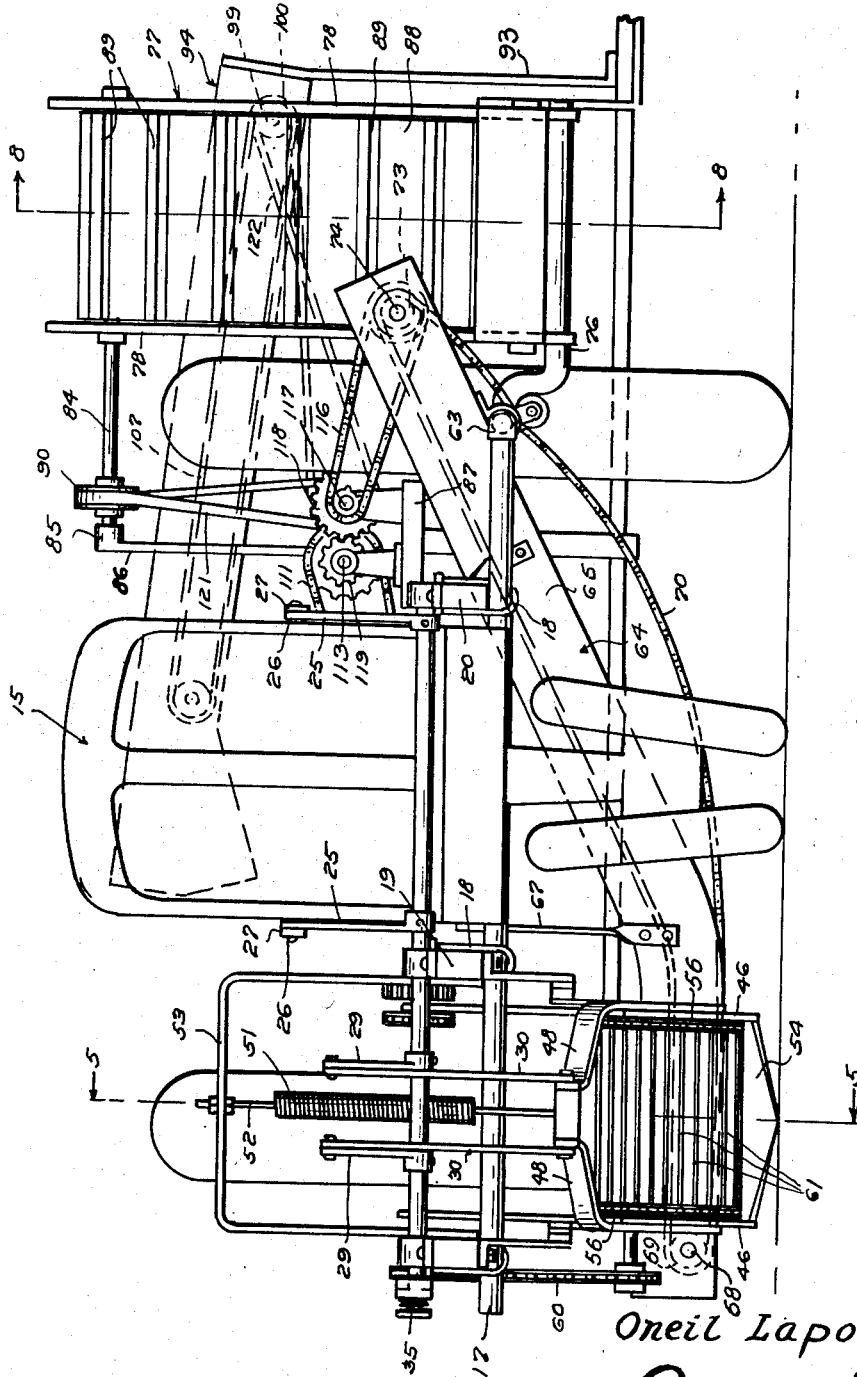
Figure 3:
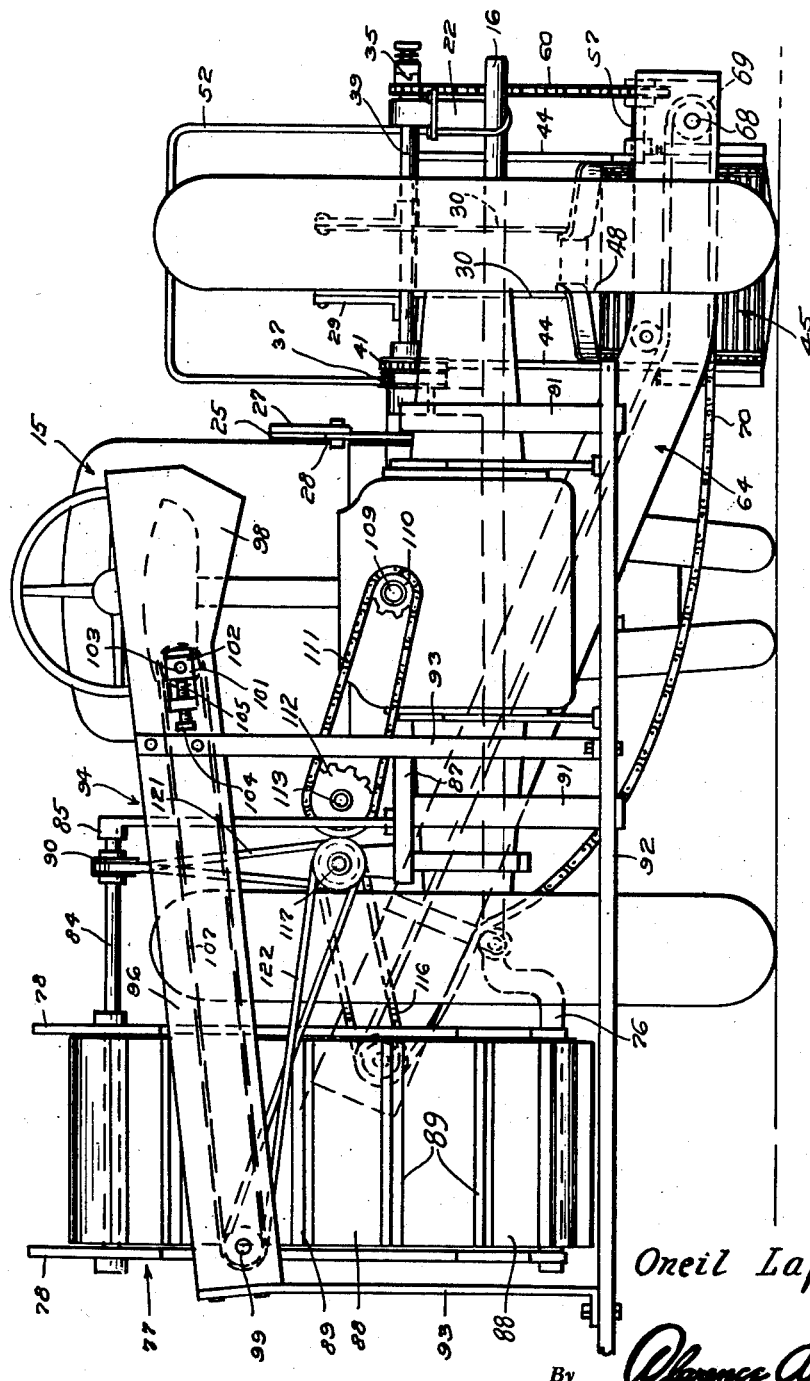
Figure 4:
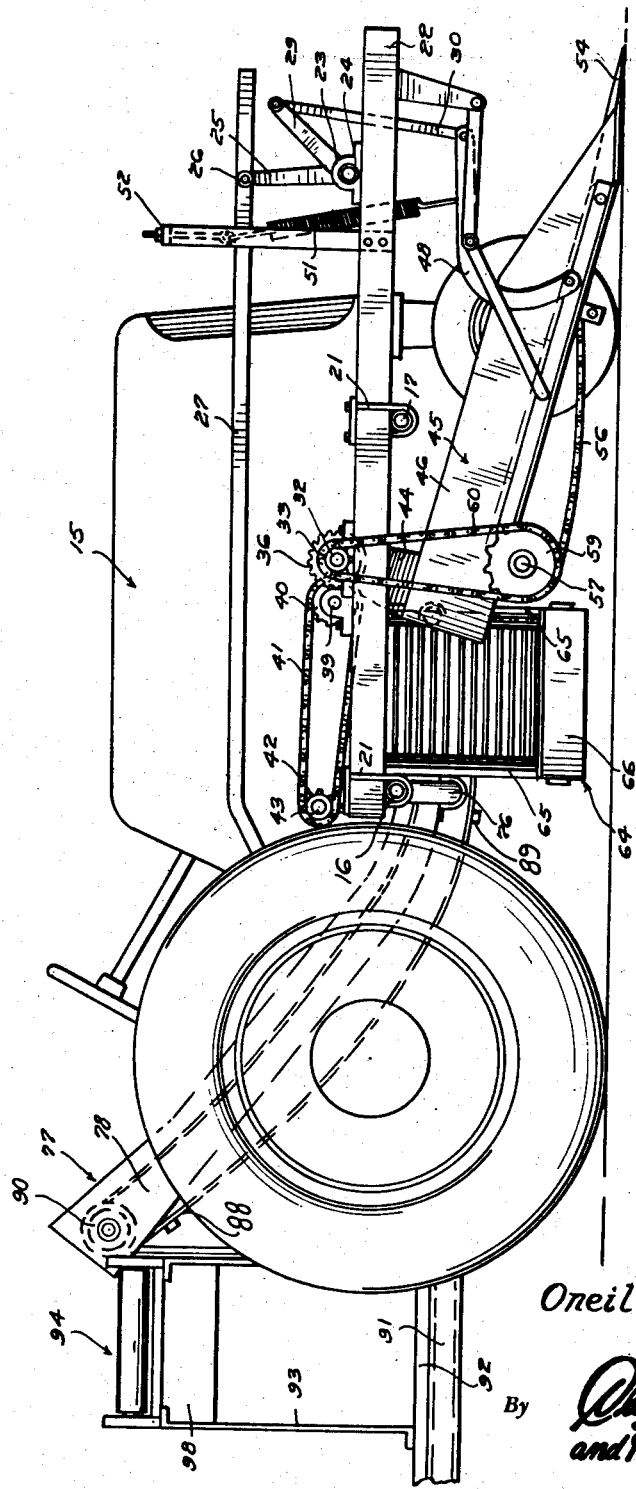

In the drawings:

Figure 1 is a top plan view of a root vegetable harvester embodying the features of this invention, Figure 2 is a front end view of Figure 1 on a somewhat enlarged scale, Figure 3 is a rear end view of Figure 1 on the scale of Figure 2, Figure 4 is a side view of Figure 1 showing the plow or digging side of the machine, Figure 5 is an enlarged sectional view through a fragment of the plow or digging conveyor showing in detail the means for raising and lowering it, Figure 6 is a transverse sectional view taken on the line 6—6 of Figure 5, Figure 7 is an enlarged sectional view taken on line 7—7 of Figure 5 and illustrating the receiving end of the transfer conveyor, Figure 8 is an enlarged longitudinal section view of the delivery conveyor showing a fragment of the picking and sorting table and its relation to the delivery conveyor, and Figure 9 is a transverse sectional view taken on the line 9—9 of Figure 8.

Referring to the drawings in detail a tractor designated generally 15 has attached beneath the side rails of its under frame or chassis spaced parallel transversely extending bars 16 and 17, and supported on these transverse bars adjacent opposite sides of the tractor as by U-bolts 18 are longitudinally extending parallel beams 19 and 20. Supported on U-bolts 21 adjacent the extreme outer ends of the bars 16 and 17 on the right hand side of the tractor as viewed from the driver's seat thereof is a beam 22 which extends in spaced parallel relation to the beam 19 and terminates at opposite ends in planes coincident with the terminals of the beams 19 and 20. As shown in Figures 1 and 4 the forward ends of the beams 19, 20 and 22 project for a considerable distance beyond the forward end of the tractor 15 and rotatably supported in brackets 23 near the forward ends of the beams is a transversely extending shaft 24 to which are attached adjacent the beams 19 and 20 upwardly extending levers 25. Pivotally connected at 26 (Figure 4) to the upper ends of the levers 25 are longitudinally extending links 27 which extend rearwardly adjacent opposite sides of the tractor to a point near the driver's seat thereof where they are pivotally connected to levers 28 which in turn are mounted on opposite ends of drive shaft of a conventional power lift unit the operation of which is controlled from the driver's seat. Attached to the shaft 25 between the beams 19 and 22 is a pair of spaced upwardly and forwardly extending lever arms 29 to the upper ends of which are pivoted links 30 the purpose of which will be more fully hereinafter described.

Mounted in bearings 31 carried by beams 19 and 22 between the bars 16 and 17 is a transverse shaft 32 carrying adjacent its outer end a freely rotating sprocket 33 carrying a clutch half 34 with which a spring pressed clutch half 35 cooperates. The spring pressed clutch half is arranged for longitudinal movement on the shaft 32 but is keyed or splined so as to rotate therewith when the shaft is driven. Fixed to the inner end of the shaft 32 is a gear 36 which meshes with a pinion 37 carried at the inner end of a drive shaft 39 which extends transversely between the beams 19 and 22 immediately behind the shaft 32. A sprocket 40 is fixed to the shaft 39 adjacent the pinion 37 and trained over this sprocket 40 is a chain 41 which has driving connection with a sprocket 42 which is attached to the power pulley shaft 43 of the tractor.

Mounted for independent rotation about the shaft 32 adjacent the beams 19 and 22 are hangers 44 (Figures 4 and 5) the lower ends of which support the rear end of a conveyor chute designated generally 45. This conveyor chute comprises a pair of side walls 46 held in spaced parallel relation by spaced cross strips 47. Secured to the side walls 46 near their forward ends is a pair of brackets 48, the upper ends of which curve inwardly and forwardly and are pivotally supported at 49 on the lower ends of the links 30 previously described. Extending transversely between the brackets near their forward ends is a bar 50 which is provided intermediate its ends with an opening to receive the lower hooked end of a heavy retractile coiled spring 51 the upper end of which is connected to the eye of an eye bolt 52 which is adjustably mounted in an inverted U-shaped yoke 53 the legs of which are attached to the beams 19 and 22. Fixed between the lower forward ends of the side walls 46 of the conveyor chute is a plow or spade blade 54 which is adapted to serve as the vegetable digger and uprooter as the machine is advanced. Mounted for rotation between the side walls 46 of the conveyor chute 45 immediately behind the blade 54 is an idler roller 55 over which a pair of endless conveyor chains 56 are adapted to run. Rotatably mounted adjacent the rear end of the conveyer chute 45 slightly below the lower edge of the side walls 46 is a transversely extending shaft 57 carrying adjacent opposite ends sprockets 58 with which the chains 56 have driving connection. A drive sprocket 59 is carried at the extreme outer end of the shaft 57 and has driving connection with the sprocket 33 through the medium of drive chain 60. Attached to the conveyor chains 56 and extending transversely of the conveyor chute 45 between its side walls 46 are spaced horizontally disposed bars 61 (Figures 1 and 2) forming the floor of the conveyor upon which the vegetables are initially deposited by the plow or spade blade 54. A guide roller 62 may be arranged to extend transversely slightly below the side walls 46 of the conveyor chute and somewhat to the rear of the idler roller 55 to lift the lower runs of the chains 56 so as to keep them and the bars 61 forming the conveyor floor from dragging on the ground.

As shown in Figure 1 the bars 16 and 17 extend beyond the sides of the tractor on the side opposite the conveyor chute 45 and the bar 17 carries at its extreme end a rearwardly extending bar 63 which as shown in Figure 2 is connected to the upper end of a transversely extending conveyor designated generally 64. Like the conveyor just described the conveyor 64 comprises a pair of spaced parallel side walls 65 the major portion of which are inclined upwardly from a plane below the rear end of the conveyor chute 45 to a point on the opposite side of the machine above the level thereof. The forward lower ends of the sides 65 extend horizontally for a distance substantially equal to the width of the conveyor chute 45 and carried at the extreme end of these horizontal portions is an end wall 66. The horizontal portion of the conveyor 64 is supported on hangers 67 the upper ends of which are attached to the side beams 19 and 22. Extending transversely between the side walls 65 adjacent the end wall 66 is a shaft 68 carrying at opposite ends and adjacent the side walls 65 idler sprockets 69 over which a pair of spaced chains 70 are adapted to run. The top run of each chain is held in a substantially horizontal plane for the length of the horizontal portions of the side walls 65 by means of guide sprockets 71 mounted to rotate on trunnions 72 carried by the inner faces of the side walls 65. The chains 70 have driving connection with drive sprockets 73 carried adjacent opposite ends of a drive shaft 74 which extends transversely between the upper ends of the side walls 65. The rear end of the shaft 74 extends beyond the rear side wall 65 and carries at its extreme end a drive sprocket 75 (Figure 1). Like the conveyor chains 56 the space between the conveyor chains 70 is bridged by spaced parallel transversely extending bars which form the bottom of the conveyor 64.

Supported on a downwardly offset extension 76 of the bar 16 is the lower end of an elevating conveyor designated generally 77 the lower end of which is disposed beneath the discharge end of the transverse conveyor 64 in such position as to receive the vegetables discharged from the latter. Like the conveyor previously described the conveyor 77 comprises a pair of spaced side walls 78 joined at their lower ends by a transversely extending end wall 79. A woven wire or link belt 88 is arranged to run over idler sprockets 81 mounted on a shaft 82 extending between the lower forward ends of the side walls 78 and over drive sprockets 83 carried by a drive shaft 84 extending transversely between the side walls 78 adjacent their upper rear ends. As illustrated in Figures 2 and 3 this shaft 84 extends through the inner side wall 78 and its extreme inner end is carried in a bearing 85 carried at the upper end of a bracket 86 the lower end of which is fixed to a platform 87 mounted adjacent the rear end of the tractor. The woven wire or link belt 88 trained over the sprockets 81 and 83 carries on its outer side spaced parallel cleats 89 which serve to aid in elevating the vegetables deposited thereon from the conveyor 64.

Depending from the rear end of the frame of the tractor 15 are brackets 91 supporting at their lower ends a work platform 92 carrying standards 93 to the upper ends of which a picking table designated generally 94 is attached. As shown in Figure 3 this table inclines upwardly from its receiving end, which is positioned beneath the discharge end of the conveyor 77, to a point slightly beyond the vertical center of the tractor 15 so that the vegetables deposited thereon travel upwardly to a slight extent. This table 94 comprises a bottom 95 (Figure 8) to which side walls 96 and an end wall 97 are attached so as to form in effect a shallow trough open at its elevated end and terminating thereat in a discharge chute 98. Rotatably mounted in the trough near its closed end is a transversely extending drive shaft 99 the forward end of which projects through the forward side wall 96 and carries a drive pulley 100. Mounted in slots 101 formed in the side walls 96 adjacent the junction of the trough and the discharge chute 98 are bearing blocks 102 in which a transversely extending idler shaft 103 is journalled. Adjusting screws 104 are mounted in outwardly projecting ears 105 carried by the side walls 96 and bear against the blocks 102. Mounted on the shafts 89 and 103 are rollers 106 (Figure 8) over which runs an endless belt 107 of suitable flexible material such as rubberized canvas to the outer surface of which are attached transversely extending vegetable contacting cleats 108. Referring back to the mounting for the idler shaft 103 it is obvious that by turning the screws 104 in their supporting ears the bearing blocks can be moved to produce varying degrees of slack in the belt 107.

Attached to the power take-off shaft 109 of the tractor is a sprocket 110 over which a drive chain 111 runs. This chain has driving connection with a sprocket 112 carried by a main drive shaft 113 mounted in bearings 114 and extending parallel with the longitudinal axis of the tractor as shown in Figure 1. Carried at the extreme forward end of the main drive shaft 113 is a sprocket 115 over which a chain 116 is trained. This chain has driving connection with the sprocket 75, previously referred to, for driving the movable elements of conveyor 64. Mounted for rotation in parallel rotation to the main drive shaft 113 is a rearwardly extending jack shaft 117 carrying adjacent its forward end a gear 118 which is adapted to mesh with a pinion 119 carried on the shaft 113 near the sprocket 112. Fixed to the shaft 117 at its rear extremity is a double grooved pulley 120 in the grooves of which belts 121 and 122 are operable. These belts have driving connections respectively with the pulleys 90 and 99 so that when the shaft 117 is rotated both the movable elements of the conveyor 77 and these of the picking table 95 will be operable.

In use it will be seen that as the machine advances and the blade 54 is lowered, it will be forced into the soil beneath the vegetables embedded therein. The advance of the machine causes a loosening of the vegetables and lifts them together with some of the soil up to the receiving end of the conveyor 45. Being driven by the power pulley drive shaft 43 of the tractor the movable elements of the conveyor 45 including the spaced bars 61 cause the vegetables to travel upwardly and toward the rear end of the machine. During this travel owing to the spaces between the bars 61 much of the earth and debris picked up by the blade 54 along with the vegetables is discharged back into the furrow created by the blade and is compacted by the advance of the traction wheel thereover. Upon reaching the rear elevated end of the conveyor 45, the vegetables are discharged therefrom onto the lower end of the transverse conveyor 64 where they again are supported on spaced cross bars forming the moving bottom of the conveyor. During their travel on the transverse conveyor 64 from its lower receiving end to its upper discharge end the vegetables are further separated from any surrounding earth and debris so that by the time they reach the discharge end of the transverse conveyor 64 most of the undesirable matter has been sifted out. Upon leaving the discharge end of the transverse conveyor 64, the vegetables are deposited on the lower receiving end of the conveyor 77 the longitudinal axis of which extends parallel to that of the conveyor 45 but perpendicular to that of the transverse conveyor 64. This conveyor 77 rises on a fairly steep incline from its lower receiving end positioned beneath the upper end of the conveyor 64 to its discharge end adjacent the rear end of the tractor and due to fact that its bottom 88 is formed of woven wire or mesh there is nothing to keep the vegetables from rolling back down into the receiving end thereof. As a consequence the cleats 89 are employed to insure uninterrupted progress of the vegetables to the upper discharge end of the conveyor. At the discharge end of the conveyor 77 the vegetables are deposited on the endless belt 107 of the picking table 94. It is inevitable in an operation of this kind that stones of considerable size and other debris will reach the discharge end of the conveyor 77 and it is for the purpose of subjecting the vegetables to a visual inspection and to present an opportunity to have foreign matter removed from among them that they are deposited on the picking table. Operators may stand on the platform and remove stones or other foreign matter as it travels on the belt 107 toward the discharge chute 98 from which the cleaned vegetables are discharged into suitable packages such as barrels or bags.

From the foregoing it will be seen that a long travel distance for the vegetables is contracted into a relatively small area so that compactness is achieved and yet the efficiency of the cleaning operation is preserved.

While in the foregoing there has been shown and described the preferred embodiment of this invention it is to be understood that minor changes in the details of construction, combination and arrangement of parts may be resorted to without departing from the spirit and scope of the invention as claimed.

What is claimed is:

1. A root vegetable digger and cleaner comprising a first conveyor mounted on one side of a vehicle adjacent its forward end in parallel relation to its longitudinal axis, a digger blade at the forward end of the first conveyor, a second conveyor extending perpendicular to the first conveyor intermediate the ends of the vehicle and adapted to receive vegetables discharged from the first conveyor, a third conveyor extending parallel with the first conveyor on the side of the vehicle opposite the first conveyor and adapted to receive vegetables from the discharge end of the second conveyor and deliver them to a picking table which extends across the rear of the vehicle parallel with the second conveyor, means on the vehicles to raise or lower the forward end of the first conveyor out of or into digging position and a yielding support carried adjacent the forward end of the vehicle for supporting the forward end of the first conveyor.

2. The combination with a tractor of a harvester mounted thereon comprising a longitudinal digger-conveyor positioned on one side of the tractor and parallel therewith, a transverse conveyor extending perpendicularly from the rear end of the digger-conveyor and underneath the tractor body to the other side of the tractor, a longitudinal conveyor parallel with said digger-conveyor but positioned rearwardly thereof on the other side of the tractor therefrom and extending from one end of the transverse conveyor to the rear end of the tractor, and a second transverse conveyor positioned at substantially the rear of the tractor and adapted to receive bodies discharged from the rear end of the longitudinal conveyor.

3. The combination with a tractor of a harvester comprising a plurality of conveyors mounted on opposed sides of the tractor in parallel and staggered relationship, a transfer conveyor disposed underneath the tractor transversely and medially thereof and having opposed end portions respectively communicating with the conveyors on opposed sides of the tractor, and a transverse conveyor disposed at the rear portion of the tractor perpendicularly to the conveyors on opposed sides thereof but parallel with the transfer conveyor and adapted to receive bodies discharged from at least one of such conveyors.

ONEIL LAPOINTE.

REFERENCES CITED

The following references are of record in the file of this patent:

UNITED STATES PATENTS

| Number | Name | Date |
| --- | --- | --- |
| 1,282,657 | Tussing | Oct. 22, 1918 |
| 1,371,360 | Frankman | Mar. 15, 1921 |
| 1,591,824 | Herold | July 6, 1926 |
| 1,761,286 | Zuckerman | June 3, 1930 |
| 2,015,549 | Dwyer | Sept. 24, 1935 |
| 2,027,840 | Rodin | Jan. 14, 1936 |
| 2,095,428 | Batie | Oct. 12, 1937 |
| 2,215,516 | Schooler | Sept. 24, 1940 |
| 2,249,394 | Noffsinger | July 15, 1941 |

FOREIGN PATENTS

| Number | Country | Date |
| --- | --- | --- |
| 253,970 | Great Britain | June 28, 1926 |
| 562,240 | Germany | Oct. 22, 1932 |